United States Patent [19]

Wichman et al.

[11] Patent Number: 5,712,991
[45] Date of Patent: Jan. 27, 1998

[54] BUFFER MEMORY FOR I/O WRITES PROGRAMMABLE SELECTIVE

[75] Inventors: Shannon A. Wichman; John Cornish, both of Dallas; Qadeer A. Qureshi, Round Rock, all of Tex.

[73] Assignee: Texas Instrument Incorporated, Dallas, Tex.

[21] Appl. No.: 374,357

[22] Filed: Jan. 18, 1995

[51] Int. Cl.[6] .................................................. G06F 13/14
[52] U.S. Cl. ........................ 395/250; 395/872; 395/856
[58] Field of Search ................................ 395/250, 872, 395/490, 497.01, 856

[56] References Cited

U.S. PATENT DOCUMENTS

| | | | |
|---|---|---|---|
| 5,189,665 | 2/1993 | Niehaus | 370/58.1 |
| 5,263,142 | 11/1993 | Watkins et al. | 395/842 |
| 5,267,191 | 11/1993 | Simpson | 365/78 |
| 5,317,210 | 5/1994 | Patel | 326/40 |
| 5,418,927 | 5/1995 | Chang et al. | 395/490 |
| 5,423,016 | 6/1995 | Tsuchiya et al. | 395/450 |

*Primary Examiner*—Parshotam S. Lall
*Assistant Examiner*—Viet Vu
*Attorney, Agent, or Firm*—J. Dennis Moore; James C. Kesterson; Richard L. Donaldson

[57] ABSTRACT

A peripheral controller device (14) controlling at least a first peripheral device (16) attached thereto, the controller device including a programmable and selectable buffer memory for utilization with a first type and a second type of write instruction for writing data to first type (24) and a second type (26), respectively, of memory in the peripheral device (16). The peripheral controller device includes an n deep buffer memory (36), where n is an integer greater than one, for buffering the write instructions. A user may programmably indicate whether only the first type of write instruction is to be buffered or both types of instructions are to be buffered. Responsive to such programming, write instructions are examined to determine if they are of the first type or the second type. Depending on the programming, write instructions of the second type are routed to the buffer or are routed by bypassing the buffer memory.

3 Claims, 2 Drawing Sheets

BUFFER MEMORY FOR I/O WRITES PROGRAMMABLE SELECTIVE

TECHNICAL FIELD OF THE INVENTION

This invention relates to the writing of data to peripheral devices in a personal computer system, and more particularly relates to the buffering of memory and I/O write cycles.

BACKGROUND OF THE INVENTION

Personal computers typically have the capability to read and write data to and from peripheral devices, such as modem cards, audio cards, and the like. For example, referring to FIG. 1, which depicts a typical arrangement, such a computer may have a host processor 10, such as a Pentium™ processor, connected to a system bus 12, which may be a Peripheral Component Interconnect ("PCI") bus, to which a controller device such as a Personal Computer Memory Card International Association ("PCMCIA") controller device 14 is also connected, the controller device 14 having attached to it two peripheral cards 16, 18, such as PCMCIA cards, which may be referred to as card "A" and card "B", respectively.

The controller device 14 includes I/O registers 20 and Configuration Registers 22. Card A 16 includes memory 24, while card B 18 includes Input/Output ("I/O") registers 26. Note that card A 16 could also include configuration registers as well, but they are omitted from the figure for purposes of simplifying this discussion. Read and Write commands with respect to the arrangement shown in FIG. 1 are of three types, Configuration commands, I/O commands and Memory commands, depending on the type of storage unit to which the command is executed. Configuration Read and Write commands are executed with respect to configuration registers, such as configuration registers 26. I/O commands are executed with respect to I/O registers, which in the case of FIG. 1 could be I/O registers 20 on controller device 14 or I/O registers 18 on card B.

The present invention is concerned with only those write commands executed with respect to storage units in card A 16 and card B 18, i.e., I/O writes and Memory writes. In order to improve overall computer system performance it is not desirable to require the system bus 12 to be held by controller device 14 until a write operation to card A 16 or card B 18 is complete. It is therefore desirable to, rather, buffer such commands such that the command, and the address and data for the command, are stored in the buffer immediately and the system bus 12 released immediately. The commands are subsequently executed by the controller device without further need to interact with system bus 12.

The problem is that while it is usually desirable to buffer memory writes, some I/O registers on peripheral cards require that I/O writes to them be executed immediately, without the delay occasioned by buffering. On the other hand, other I/O registers do not so require, and buffering would be desirable for them as well.

SUMMARY OF THE INVENTION

The present invention permits a user to optimize a computer system with respect to memory and I/O writes of the type described above. In accordance with the present invention there is provided a peripheral controller device controlling at least a first peripheral device attached thereto, the controller device including a programmable and selectable buffer memory for utilization with a first type and a second type of write instruction for writing data to first type and a second type, respectively, of memory in the peripheral device. The peripheral controller device includes an n deep buffer memory, where n is an integer greater than one, for buffering the write instructions. A user may programmably indicate whether only the first type of write instruction is to be buffered or both types of instructions are to be buffered. Responsive to such programming, write instructions are examined to determine if they are of the first type or the second type. Depending on the programming, write instructions of the second type are routed to the buffer or are routed by bypassing the buffer memory.

These and other features of the invention will be apparent to those skilled in the art from the following detailed description of the invention, taken together with the accompanying drawings.

DETAILED DESCRIPTION OF THE INVENTION

Figure 2:
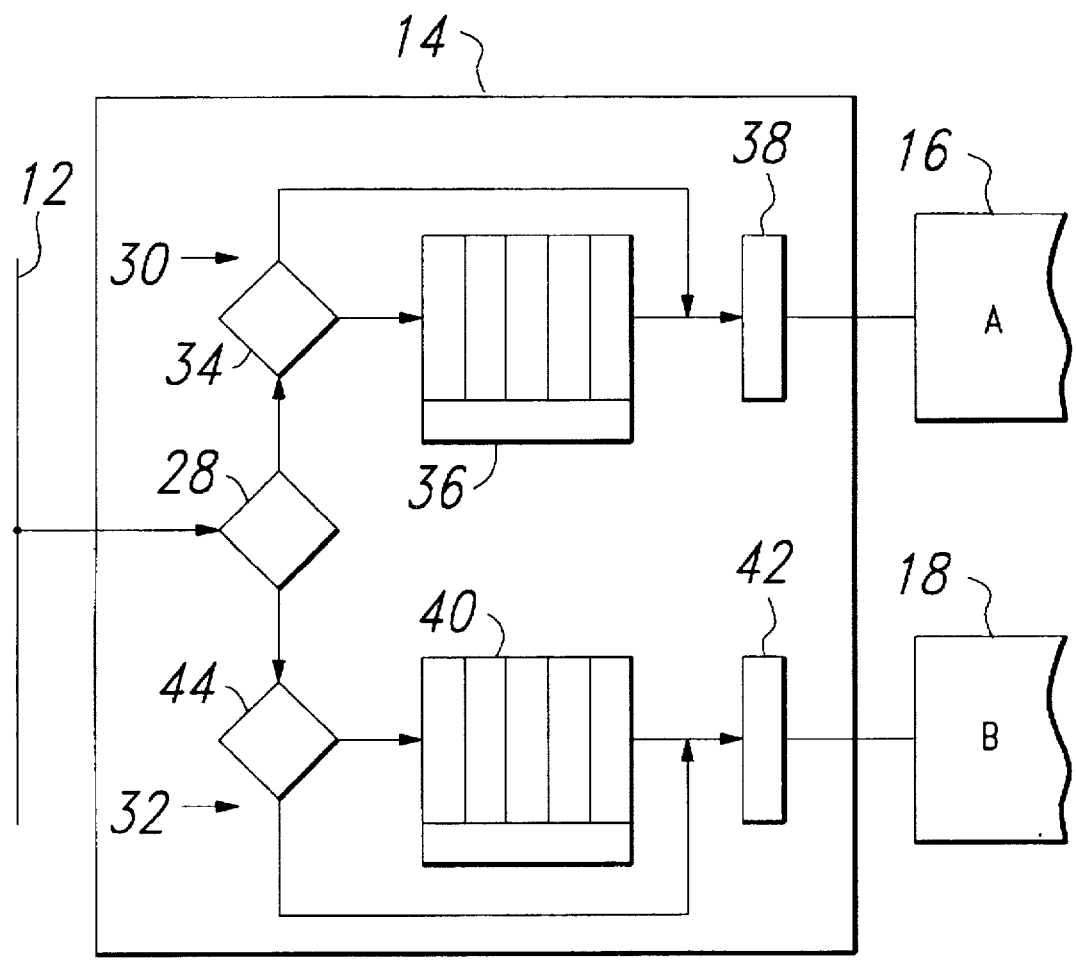
FIG. 2 is a block diagram of a portion of a controller device showing a first portion of the preferred embodiment of the present invention.
Figure 3:
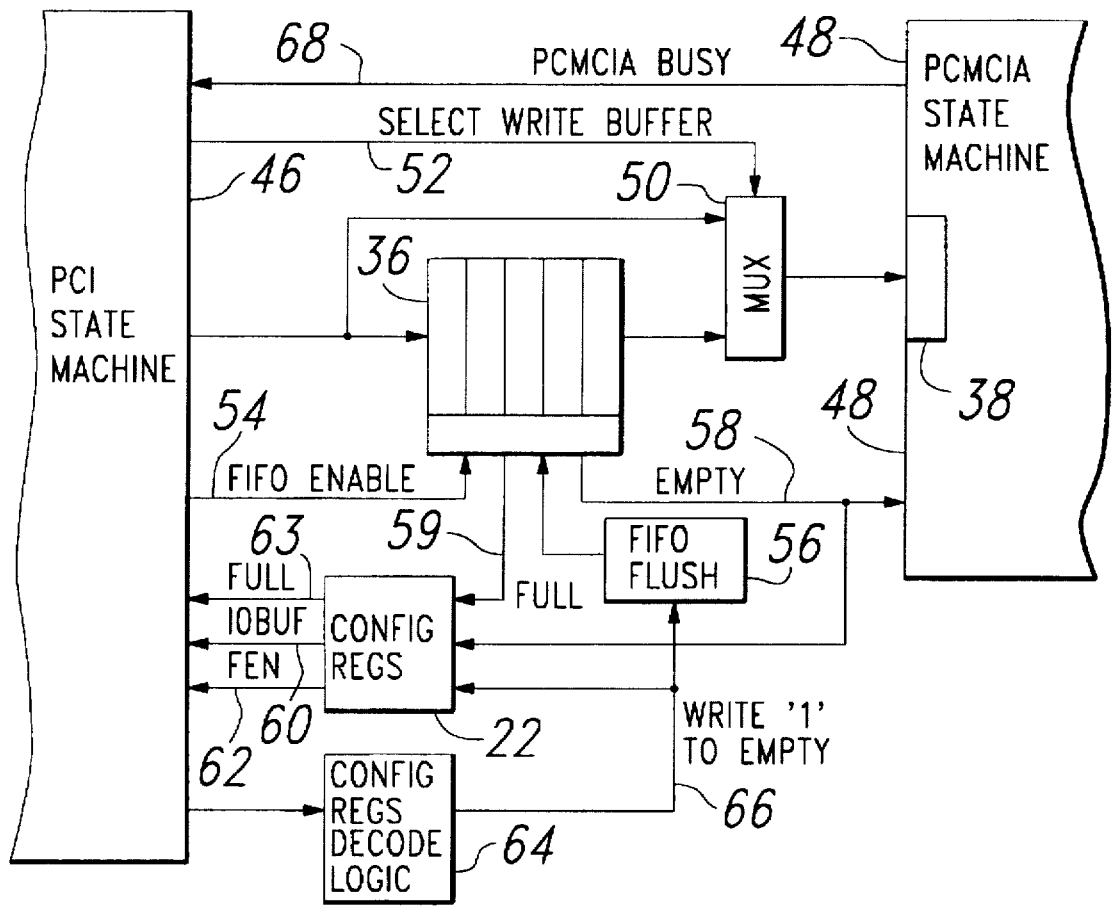
FIG. 3 is a block diagram of a portion of the controller device shown in FIG. 2, showing a second portion of the preferred embodiment of the present invention.

FIG. 2 shows a portion of controller device 14 including a first portion of the preferred embodiment of the present invention. The second portion of the preferred embodiment is shown in FIG. 3.

Referring now to FIG. 2, a write command, data, and the address for the data, hereinafter collectively referred to as the "Instruction," come into the controller device 14 on the system bus 12. The Instruction is applied to a first routing point 28 at which the address is examined to determine whether it is for card A 16 or card B 18, and routed appropriately to one of two identical paths 30 and 32, leading to card A 16 or card B 18, as the case may be. Since the paths 30, 32, are identical, a description of only one is necessary for a complete understanding of the preferred embodiment.

If the Instruction is routed to card A at routing point 28, it is applied first to a second routing point 34, at which the Instruction is examined, based on criteria discussed below, to determine whether it is to be routed to a write buffer 36, which in the preferred embodiment is a four-deep FIFO, or to be routed directly to a default buffer 38. It will be understood that a single level of buffering is always acceptable for timing purposes, even for I/O writes. Instructions routed to write buffer 36 eventually are passed out to buffer 38. Instructions are executed from default buffer 38 to write data to card A 16 in accordance with known principles. Note write buffer 40, default buffer 42 and decision point 44 in data path 32, corresponding to write buffer 36, default buffer 38 and decision point 34, respectively, in data path 30.

Write buffer 36 can be configured to be either one deep or four deep. The buffer 36 can be turned on/off and configured to accept only memory Instructions or both memory and I/O Instructions. Configuration is performed by writing bits to bit positions named IOBUF, FDEP and FEN, in one of the Configuration Registers 22. Two other bit positions named FULL and EMPTY are used to indicate the current status of the write buffer. Bit names, access (read-only [R] or read and write[R/W]), and functional description are presented in Table 1:

TABLE 1

| Name | Access | Description |
|---|---|---|
| IOBUF | R/W | Write buffer Instruction select<br>0 = Memory writes only to write buffer<br>1 = Memory and I/O writes to write buffer |
| FDEP | R/W | Write buffer depth<br>0 = four deep<br>1 = one deep |
| FEN | R/W | Write buffer enable/disable<br>0 = Write buffer off<br>1 = Write buffer on |
| FULL | R | Write buffer full<br>0 = Write buffer not full<br>1 = Write buffer full |
| EMPTY | R/W | When read, this bit indicates write buffer status.<br>Read 0 = Write buffer not empty<br>Read 1 = Write buffer empty<br>When written to, this bit allows software to flush the write buffer.<br>0 = No change<br>1 = Flush write buffer |

As can be seen from Table 1, excellent programmability is provided for the write buffer. Implementation of data path 30 will now be explained in conjunction with FIG. 3. FIG. 3 shows more detail of data path 30. Note that two major elements of controller device 14 not shown in FIG. 2 are shown in FIG. 3, namely a PCI State Machine 46 and PCMCIA State Machine 48. These elements are well known in their functionality and implementation, with the exception of the logic required to implement the preferred embodiment of the present invention. Such logic is explained in detail hereinbelow, and can be added to a PCI, PCMCIA, or, indeed, any state machine or other logic implementing bus interfaces, by those of ordinary skill in the art area to which the present invention pertains. In addition, note that the format of FIG. 3 is slightly different than that of FIG. 2. Thus, while decision points 28 and 34 were identified as specific items in FIG. 2 to aid in simplifying the explanation of the concepts implemented in the preferred embodiment, this function is actually implemented by involvement of the PCI State Machine 46 shown in FIG. 3, and other components, as will be described in detail hereinbelow.

Figure 1:
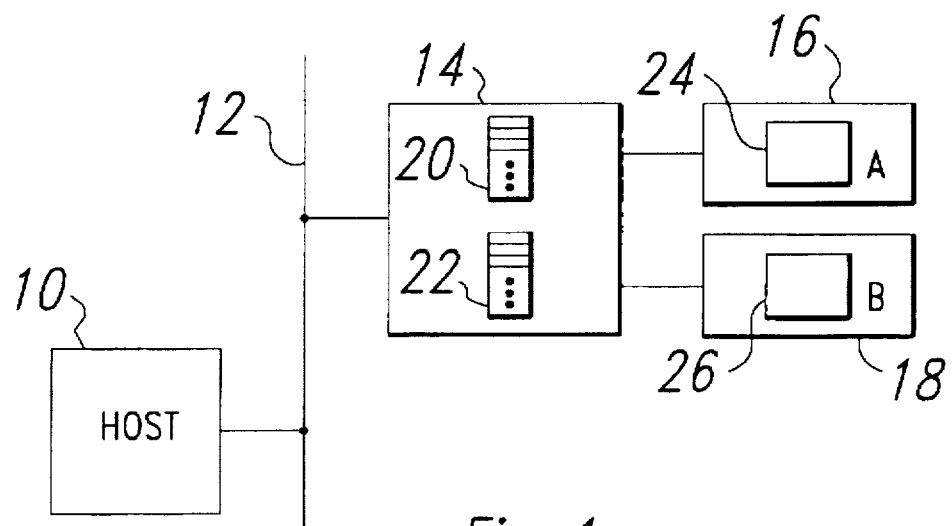
FIG. 1 is a block diagram of a portion of a personal computer in which an embodiment of the present invention can operate.

In addition to the four-deep FIFO write buffer 36, PCI State Machine 46, PCMCIA State Machine 48 and Configuration Registers 22 (FIG. 1), also shown in FIG. 3 are a multiplexer 50 that receives at its inputs the write Instruction directly from PCI State machine 46 or from write buffer 36. A Select Write Buffer signal is received at the select input of multiplexer 50 on line 52 from the PCI State Machine 46. The output of multiplexer 50 is provided to buffer 38 in PCMCIA State Machine 48, from which the write Instruction can be executed as described above. A FIFO enable signal is provided by the PCI State Machine 46 on line 54 by which it is applied to write buffer 36 to enable it. A FIFO Flush unit 56 flushes write buffer 36 when signaled to do so. Write buffer 36 signals to PCMCIA State Machine 48 that it is empty on line EMPTY 58. Line 58 is provided to the Configuration Registers 22 to set the EMPTY bit to indicate status (but not to force a flush of the write buffer 36), and line 59 is provided to the Configuration Registers 22 to set the FULL bit status. Lines IOBUF 60, FEN 62 and FULL 63 carry the value of bits IOBUF, FEN and FULL to the PCI State machine 46. A Configuration Register Decode Logic unit 64 is provided, of known design receiving instructions from the PCI State Machine 46, with the capability to receive an Instruction to write a "1" to the Configuration Register 22 bit EMPTY and in response provide an output on line 66. Line 66 is connected to the Configuration Registers 22 to allow the write of the "1" to the EMPTY bit, and is connected to FIFO Flush unit 56 so as to cause a flush of write buffer 36 in response to a signal on line 66. Finally, the PCMCIA Busy signal is provided from the PCMCIA State Machine 48 to the PCI State Machine 46 on line 68.

Figure 4:
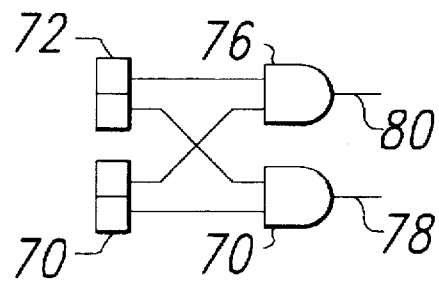
FIG. 4 is a diagram of a pointer circuit for the four deep FIFO write buffer of FIG. 2.

FIG. 4 shows how the programmability of the four deep FIFO write buffer 36 is implemented. As is known, FIFO buffers have two pointers, one for the address where the data is to be written, and the other for where the data is to be read from. A four deep FIFO buffer, having four addressable registers, requires only two pointer, or address, bits for each of the write pointer and the read pointer. Programmability is accomplished by providing, in addition to the two pointer bits, two mask bits, for each of the write pointer and the read pointer. In FIG. 4 are represented the two pointer bits 70 for one of the pointers. Also shown are the two mask bits 72. These bits are provided to the inputs of two AND gates 74, 76, as shown. The outputs 78, 80, of the two AND gates 74, 76, respectively, form the pointer bits actually applied to the FIFO buffer. To select a one deep FIFO, zeros are used for the mask bits. This causes the outputs 78, 80, to be forced to zeros, thus forcing the pointer to 00, effecting the one deep buffer. To select a four deep FIFO buffer, ones are used for the mask bits. This causes the pointer input bit values to be passed to outputs 78, 80, effecting the four deep buffer. In all other respects the four deep buffer can be implemented according to known principles.

The arrangement of FIG. 3 operates as follows. An Instruction is sent to the write buffer by activating FIFO enable signal line 54, and activating Select Write Buffer line 52. Alternatively, an Instruction is sent to the default buffer 38 by inactivating lines 54 and 52.

For memory commands the following logic is implemented in the PCI State Machine 46:

IF the command is a memory command,
    AND FEN is true (i.e., FEN=1),
    AND FULL is false (i.e., FULL=0),
    (BUSY, EMPTY and IOBUF=don't care),
    THEN send the Instruction to the write buffer.
IF the command is a memory command,
    AND FEN is true (i.e., FEN=1),
    AND FULL is true (i.e., FULL=1),
    (EMPTY and IOBUF=don't care),
    THEN terminate the Instruction (alternatively, hold the system bus until FULL is false).
IF the command is a memory command,
    AND FEN is false (i.e., FEN=0),
    AND BUSY is false (i.e., BUSY=0),
    (FULL, EMPTY and IOBUF=don't care),
    THEN send the Instruction directly to the default buffer.
IF the command is a memory command,
    AND FEN is false (i.e., FEN=0),
    AND BUSY is true (i.e., BUSY=1),
    (FULL, EMPTY and IOBUF=don't care),
    THEN terminate the Instruction (alternatively, hold the system bus until BUSY is false).

For I/O commands the following logic is implemented in the PCI State Machine 46:

IF the command is an I/O command,
   AND FEN is true (i.e., FEN=1),
   AND IOBUF is true (i.e., IOBUF=1),
   AND FULL is false (i.e., FULL=0),
   (BUSY=don't care),
   THEN send the Instruction to the write buffer.
IF the command is an I/O command,
   AND FEN is false (i.e., FEN=0),
   AND BUSY is false (i.e., BUSY=0),
   (FULL, IOBUF=don't care),
   THEN send the Instruction directly to the default buffer.
IF the command is an I/O command,
   AND FEN is false (i.e., FEN=0),
   AND BUSY is true (i.e., BUSY=1),
   (FULL, EMPTY and IOBUF=don't care),
   THEN terminate the Instruction (alternatively, hold the system bus until BUSY is false).
IF the command is an I/O command,
   AND FEN is true (i.e., FEN=1),
   AND IOBUF is false (i.e., IOBUF=0),
   AND BUSY is false (i.e., BUSY=0),
   (FULL=don't care),
   THEN send the Instruction directly to the default buffer.
IF the command is an I/O command,
   AND FEN is true (i.e., FEN=1),
   AND IOBUF is false (i.e., IOBUF=0),
   AND BUSY is true (i.e., BUSY=1),
   (FULL=don't care),
   THEN terminate the Instruction (alternatively, hold the system bus until BUSY is false).

Although the present invention and its advantages have been described in detail, it should be understood that various changes, substitutions and alterations can be made herein without departing from the spirit and scope of the invention as defined by the appended claims.

What is claimed is:

1. A peripheral controller device controlling at least a first peripheral device, said controller device including a programmable and selectable buffer memory for utilization with a first type and a second type of write instruction for writing data to first type and a second type, respectively, of memory in a peripheral device attached to said controller device, comprising:

an n deep buffer memory, where n is an integer for buffering said write instructions;

first means for programmably enabling and disabling said buffer;

second means for programmably indicating whether only one of said two types of instructions are to be buffered, or whether both of said instructions are to be buffered; and third means, responsive to said second means, for examining write instructions provided to said peripheral controller device and for determining if they are of the first type or said second type, and for routing write instructions for the peripheral device of said second type to said buffer or for bypassing said buffer memory for immediate writing of data to said peripheral device, depending on the programmed indication in said second means.

2. A peripheral controller device according to claim 1 further comprising fourth means means for programmably setting the depth of buffering in said buffer.

3. A peripheral controller device according to claim 1 wherein said peripheral controller device receives said write instructions from a source according to a first protocol, and wherein said peripheral controller device communicates with said peripheral device according to a second protocol, said peripheral controller device further comprising:

a first protocol interface element for controlling data transfers with said source, said buffer memory receiving write instructions from said first protocol interface element;

a second protocol interface element for controlling data transfers with said peripheral device;

said fourth means comprising:

a multiplexer having its first input connected to receive instructions directly from said first protocol interface element, and having its second input connected to receive instructions from said buffer memory;

fifth means for enabling and disabling said buffer memory depending on the routing decision for a write instruction;

wherein routing of instructions to said buffer memory is accomplished by enabling said multiplexer to select instructions from said second input and by enabling said buffer memory.

* * * * *